Nov. 19, 1946.　　　T. H. AFFLECK　　　2,411,406
AIR BRAKE
Filed Feb. 21, 1944
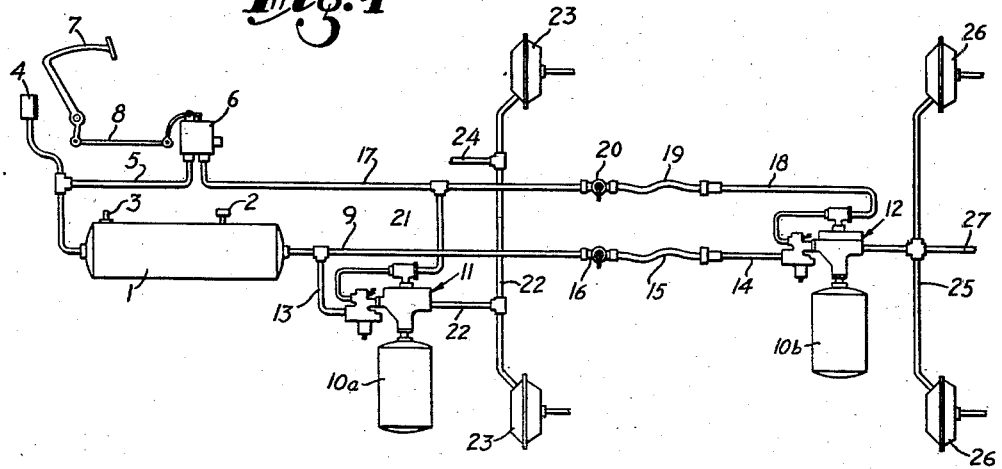
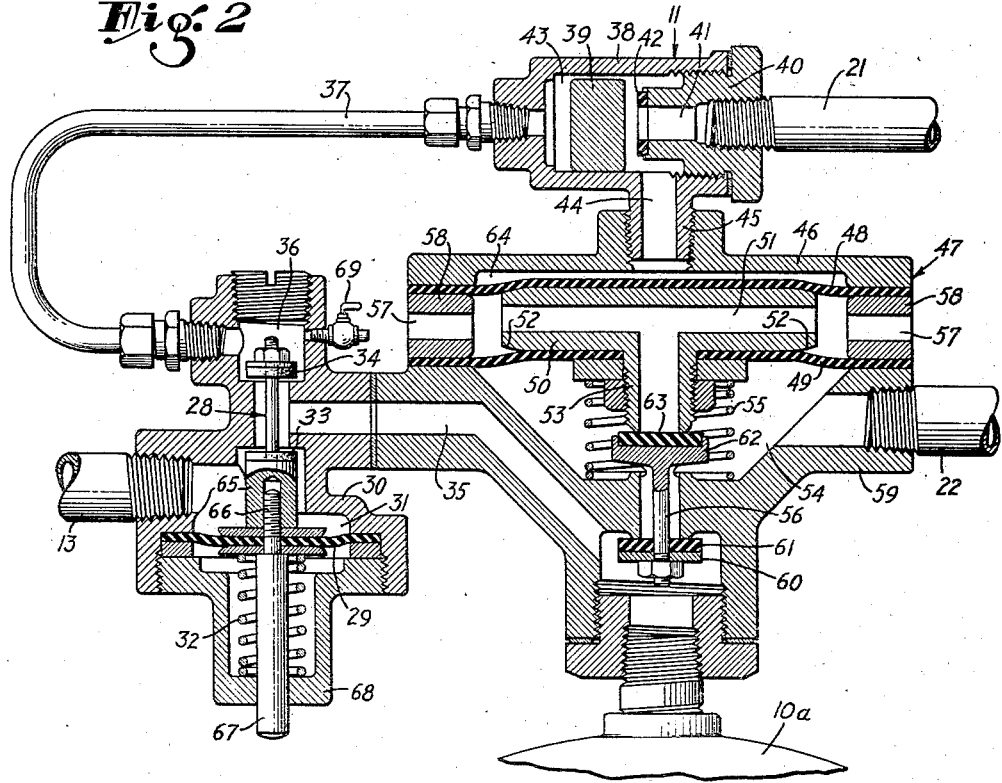
Inventor
THEODORE H AFFLECK.
By
Attorney Patented Nov. 19, 1946

2,411,406

UNITED STATES PATENT OFFICE 2,411,406

AIR BRAKE

Theodore H. Affleck, North Hollywood, Calif., assignor, by mesne assignments, to William A. Cooke, Hollywood, Calif.

Application February 21, 1944, Serial No. 523,211

8 Claims. (Cl. 303—63)

This invention relates to a fluid operated brake apparatus for vehicles and, while it can be employed merely as a brake apparatus for a vehicle such as a truck, it is also intended for use as a control for the brakes of a trailer drawn by the vehicle.

While this brake apparatus can be operated through the agency of any fluid medium, it is described in the following specification as employing compressed air, as that is a common medium now employed for applying the brakes of vehicles such as trucks, with or without trailers.

When a truck is taken out in the morning, sometimes it will be found that the pressure in its supply of operating fluid or compressed air will be reduced from leakage or other cause, and this pressure may be too low for safe operation of the truck. One of the objects of this invention is to provide fluid operated brake apparatus which will operate automatically under such conditions to fully apply the brakes of the truck and also the brakes of a trailer if the truck is drawing one. The dangerously low pressure must then be remedied before the truck can be started.

A brake apparatus of this type usually includes a main reservoir for a supply of the operating fluid under pressure and an auxiliary reservoir or tank in which the fluid under pressure is stored, and which is drawn upon to supply fluid for operating the brakes. And when a trailer is employed, a similar tank is usually provided on the trailer for applying its brakes. One of the objects of the present invention is to provide an apparatus of this type which, when the main reservoir is being charged with the operating fluid, will operate automatically after the pressure in the reservoir reaches its normal pressure, to then effect the charging of the tank and also the brake chambers of the truck to bring their pressure to the normal working pressure; and also operating automatically to effect an initial, or testing, application of the brakes.

Another object also is to construct the apparatus so that, after the brakes have been applied in this testing application, they can be readily released by the driver of the truck through the operation of his operator's valve that controls the flow of the operating fluid in the service line or control line that controls the brake mechanism under the truck and under the trailer which, in turn, controls the actual application of the brakes.

Another object of the invention is to provide apparatus of this type which will operate to apply the brakes at any time while the vehicle is being operated if the pressure of the operating fluid falls below a predetermined safe minimum; that is to say, a pressure below which the brakes can be effectively operated.

In practice, the brake mechanism of the trailer is connected to the brake piping of the vehicle through flexible connections or hose. One of the objects of this invention is to provide brake apparatus, particularly useful when applied to a trailer, which will operate automatically to apply the brakes of the trailer in case the flexible connections or hose become broken, as might happen in a situation where a trailer breaks away from the towing truck on a steep grade or under other circumstances. In such a case, the brakes would operate automatically to stop the trailer and prevent it from running away on the grade.

In its preferred embodiment, the apparatus includes a relay valve 47 which controls the flow of the operating fluid from the tank to the brake chambers that apply the brakes. Another object of the invention is to provide a pressure-controlled means controllable from the driver's position for opening the relay valve to apply the brakes at the will of the driver, and also to construct this pressure-controlled means in such a way as to enable it to cooperate with the other parts of the apparatus when the brake apparatus is being charged initially, to raise the working pressure in the tank or tanks to the normal operating pressure; and also so to construct the pressure-controlled means in such a way as to enable it to cooperate in effecting the exhaust of the fluid pressure from the brake chambers when the brakes are to be released.

In most, or all, of the air brake systems now in use, when it is necessary to adjust the brakes on a trailer, a mechanic must crawl under the trailer and then get a signal in some way, to the driver in the cab of the truck telling him when to apply and when to release the brakes. He must do this in order to inspect the push rods which project out of the brake chambers, and if these push rods project too far, he must adjust the slack adjusters to make their travel shorter. For each brake, several applications of the brakes have to be made by the driver so that the mechanic can check his work. Usually a third man is necessary to relay the signals from the mechanic under the trailer to the driver, on account of the noise of the motor, or the difficulty the driver has in seeing the mechanic under the trailer. One of the objects of this invention is to overcome this objection and to provide a brake apparatus of this type having simple means enabling a mechanic under the trailer or under the towing vehicle to apply the brakes manually, himself, independently of the driver's valve in the cab of the truck. In this way the mechanic under the truck or trailer can test the brakes and, after testing them, can release the operating fluid to release the brakes.

In some brake systems now in use the exhaust valve for exhausting the air to release the brakes is inadvertently constructed so that it is possible for dirt or grit in the service line or brake applying control line, to cause a leak by getting under the exhaust valve seat. One of the objects of this invention is to provide a construction that will insure that the exhaust line will be fully open when in use; also to provide a "dead end" service line operating so that if dirt or grit gets into this line, it can cause no obstruction of any valve, as there is no valve normally held open at the end of the service line.

Further objects and advantages of the invention will appear in the following part of the specification.

Referring to the drawing which is for illustrative purposes only,

Fig. 1 is a plan view, more or less diagrammatical in character, illustrating the general arrangement of a brake apparatus embodying this invention and showing the same as applied to a vehicle and trailer.

Fig. 2 is a central section taken through a portion of this brake apparatus and further illustrating the mechanism that is involved in the control of the brakes; that is to say, for effecting the application of the brakes and the release of the brakes. The parts in this view are shown in the relation they have when the apparatus is under normal operating pressure ready for a normal application of the brakes on the road.

In practicing this invention, under the vehicle or at some suitable point on the vehicle I provide the main source of fluid under pressure, such as a relatively large reservoir or tank 1. In practice, this tank is usually kept up to normal operating pressure by an automatic device that charges the reservoir whenever its pressure falls below a predetermined point. Usually such a reservoir, or its communicating piping, is provided with a relief valve 2 that will maintain the pressure at the desired point. And a charging connection 3 is usually provided through which the operating fluid is charged into the reservoir. In the present instance, which discloses an apparatus operated with compressed air, this connection 3 would be connected up to an air-compressor which, automatically, supplies air to the reservoir when necessary.

The pressure of the operating fluid in the reservoir 1 is preferably indicated to the driver by means of a suitable pressure gage 4 on the dash, or within view of the driver; and the operating fluid is supplied from the reservoir 1 through a pipe 5 to a driver's, or operator's, valve 6 which is operated by a foot pedal 7 connected by a link 8 to the valve, and this valve may also be controlled by a hand operated lever, if desired. In its position of rest this valve opens the service line to exhaust.

From the reservoir 1, the supply line 9 extends rearwardly on the vehicle, and this line is employed for supplying the operating fluid to the brake apparatus and for charging the tanks 10a and 10b, that are carried, respectively, on the vehicle and on the trailer. These tanks are connected up respectively to their corresponding brake control mechanisms 11 and 12, the former of which is supplied with operating fluid from a branch pipe 13 leading off from the pipe 9, and the latter of which is supplied from an extension pipe 14 that is connected by flexible connection or hose 15 to the rear end of the pipe 9. At the rear end of the pipe 9 a shut-off valve 16 should be provided which can be closed when the vehicle is not towing a trailer.

The piping includes a service line 17 which can be supplied with operating fluid from the valve 6 at the will of the driver and this pipe has an extension 18 on the trailer which is also connected by a flexible connection or hose 19 to the rear end of the service pipe at which a shut-off valve 20 is provided similar to valve 16. The rear end of the extension service pipe 18 is attached to the brake control mechanism 12 of the trailer, and a branch pipe 21 leads off from the service line 17 on the truck to connect up to its brake control mechanism 11.

From the brake control mechanism 11, brake piping 22 is provided, that leads the operating fluid to brake chambers 23, diagrammatically illustrated, which apply the brakes and, if desired, this brake piping can include a pipe connection 24 that would lead to other brake chambers similar to the brake chambers 23, in case the vehicle has four-wheel brakes. On the trailer similar brake piping 25 is provided, leading from its brake controlled mechanism 12 which connects up to brake chambers 26 on the trailer, and this piping may include a connection 27 for opening the two remaining brakes on the trailer, if the trailer has four-wheel brakes.

The brake controlled mechanisms 11 and 12 are substantially identical in construction, and, in Fig. 2, I illustrate the mechanism 11 in cross-section, and in detail. This mechanism includes a supply valve 28 which is controlled by pressure actuated means, including a movable member or diaphragm 29 in the casing 30 of this valve. The fluid under pressure flows into a pressure chamber 31 within the casing 30 and exerts its pressure upon one side of the diaphragm 29. This diaphragm is normally biased, preferably by coil spring 32, in a direction to oppose the action of the fluid pressure in the chamber 31. The supply valve 28 is a double valve, that is to say, it has a head 33 at one end and a head 34 at its other end, each head cooperating with its own valve seat. When the spring 32 is completely controlling the position of the valve 28, the lower head 33 is held upon its seat so as to check flow from the chamber 31 into a duct 35, through which the operating fluid can be supplied to the tank 10a.

The force of the spring 32 determines of course the pressure at which the valve head 33 will move off its seat and also determines the pressure at which the valve head 34 will close upon its seat, and therefore this spring acts to determine the pressure at which the charging of the tank 10a will start and also the pressure range, below normal operating pressure, at which the emergency operation of the brakes will occur.

Assuming that there is no pressure in the pressure chamber 31, when the operating fluid commences to flow into the chamber 31, the pressure in this chamber will gradually build up and cause the valve 28 to move into an intermediate position, and the operating fluid will not only flow back in the duct 35 but will also flow past the valve head 34 into the chamber 36 adjacent to it, and from this point the fluid flows over in a bypass pipe 37 over to a shuttle valve casing 38 in which is mounted a movable or floating shuttle valve 39. In the right end of the casing 38, as viewed in Fig. 2, a bushing 40 is provided, through which a passage 41 is formed, which is connected to the service line branch pipe 21. The inner end of the bushing 40 is provided with a cushion seat 42 against which the shuttle valve 39 will be pressed by the fluid pressure when it builds up in the chamber 43 in the casing 38, at the left of this valve. This shuttle valve 39 is constructed so that when seated over the passage 41, it will not close off flow of the fluid past it, and hence this fluid will then flow down through a passage 44 in the nipple 45 that attaches this casing 38 to the cover 46 of a pressure controlled device 47, the function of which is to control valve 56 of the apparatus, as will now be described.

The pressure actuated device 47 preferably includes movable means composed of two diaphragms 48 and 49 between which an exhaust head 50 is located, which head functions in such way as to cooperate in the operation of the brakes to enable operating fluid from the brakes to be exhausted to the atmosphere. The exhaust head 50 is of substantially circular form, with an exhaust chamber 51 within it. Its end faces are disposed against the adjacent faces of the diaphragms 48 and 49 and at their edges these faces are preferably chamfered, as at 52, to reduce wear on the diaphragms when the same are working against the adjacent faces of this head.

The chamber 51 communicates with the bore of a threaded nipple 53 that extends downwardly through the diaphragm 49 into a pressure chamber 54 in this pressure actuated device 47. The diaphragm 49 is normally biased toward the exhaust head 50 by a coil spring 55, which normally holds the end of the nipple 53 away from the adjacent end of the check valve 56, and in this position an exhaust outlet from the brake chambers is effected through the brake pipe 22 into the chamber 54 and thence up the tube and nipple 53 into the chamber 51 in the exhaust head; from this point passing outwardly through outlet passages 57 in an exhaust ring 58 which forms part of the casing 47, and which is secured between the head 46 and the bonnet portion 59 of this casing.

The check valve 56 is preferably in the form of a check valve that checks flow of the operating fluid from the tank 10a into the chamber 54 and for this purpose is provided with a head 60 at its end adjacent to the tank. At this point it may also be provided with a soft gasket 61 that insures a tight fluid connection when this head 60 is pressed toward its cooperating seat. The other end of the valve 56 is formed into a head 62 which is provided with a soft washer or gasket 63 to cushion the contact of the end of the nipple with the head 62 of this valve.

When the fluid pressure has built up sufficiently in the chamber 64 adjacent to the diaphragm 48, when the system is being charged with operating fluid, the diaphragm 48 will of course be forced down, overcoming the force of the spring 55, and this will bring the end of the nipple 53 against the check valve 56 and push it to its open position. This will permit operating fluid to flow from the tank 10a past the valve 56 and through chamber 54 to the brake piping 22. In other words, when the charging of the apparatus from the supply line 9 is complete, the brakes will be automatically applied, as described.

In order to release the brakes, it is merely necessary for the driver to make a normal application of the brakes by opening the valve 6 to make operating fluid flow through the service line 17. When this is done, the pressure of the operating fluid in the passage 41 will displace the shuttle valve 39 from its seat. Now, when the driver releases the valve 6, the operating fluid or compressed air in the service line 17 will flow out to the atmosphere at the valve 6, whereupon, by reason of the release of pressure in the pressure chamber 64, the spring 55 will act upon the diaphragm 49 and push it away from the relay valve 56. In this way, the nipple 53 will have its tip carried away from its cushion 63, and when this happens, exhaust will take place through the brake piping 22, chamber 47 and the exhaust head chamber 51, to the atmosphere, through the outlets 57.

Referring again to the supply valve 28, it should be said that I construct this valve so that it can be opened by a brake-tester under the truck or under the trailer to effect a testing application of the brakes. And means is also provided for releasing the operating fluid employed in effecting this test. For this purpose the connection between the valve 28 and the diaphragm 29 includes a block or sleeve 65 that is formed integrally with the body of the valve 28, and the end of this part remote from the valve has a threaded connection to a threaded tip 66 on a stem 67, one end of which projects through the bonnet 68 to the exterior of the casing 30. With this construction, it is evident that by pressing against the projecting end of this stem 67 the valve 38 can be moved forward so as to unseat its remote head 34 and permit operating fluid to flow from the duct 35 through the bypass 37 and thence into the chamber 43, at which it will pass the shuttle valve 39 and flow through the passage 44 in the nipple 45 to enter the chamber 64, thereby pushing down the nipple 53 and opening the valve 56. This will admit operating fluid from the tank 10a to the brake chambers 23.

This enables a brake-tester under the truck to make a test of the brakes independently of the operation of the driver's valve 6. And, after the brake-tester has applied the brakes in this way, he can release them by releasing the operating fluid from the chamber 36 through the agency of a small stop-cock or valve 69, thereby releasing the pressure in the bypass 37, which will of course release the pressure in the chamber 64, permitting the spring 55 to raise the exhaust head 50 and open up the nipple 53 to carry the fluid pressure out of the brake chambers.

The mode of operation of the entire apparatus will now be briefly stated.

When there is no pressure in the system the valves 33 of the controls 11 and 12 are both closed. Therefore when the charging operation is started, the pressure in the reservoir 1 will first be raised through an intermediate range of pressure, and this will occur before the pressure is raised in the tank 10a of the truck; or the tank 10b of the trailer, if the truck is towing one. The charging of the reservoir 1 will continue in this way until the pressure in the chamber 31 (see Fig. 2) rises sufficiently to overcome the spring pressure 32 and commences to open the supply valve or emergency valve 28. This valve does not move immediately to the extreme position that the diaphragm 29 could move it to, but will assume an intermediate or emergency position in which both valve heads 33 and 34 are "cracked," and, when this occurs, the operating fluid will be delivered past the head 33 into the duct 35 which leads back to the tank 10a; and at the same time the fluid will pass the head 34 and flow through chamber 36 into the bypass 37. This will build up pressure in the chamber 43 and force the shuttle valve 39 over against the seat 42, thereby preventing loss of operating fluid into the service line connection 21. The operating fluid will then flow past the shuttle valve 39 which does not completely fill its guiding bore, and will pass through the nipple 45 into the chamber 64, where it will flex the diaphragms 48 and 49, thereby moving the end of the nipple 53 against the head of the check valve 56. As soon as this valve opens, there will occur an emergency or automatic application of the brakes, for operating fluid will flow from the duct 35 into the chamber 54 and thence into the brake piping 22 to charge the brake chambers 23 with operating fluid. If the truck has a trailer attached, the valve 16 would be in its open position instead of the closed position indicated in Fig. 1, and the charging fluid flowing rearwardly in the pipe 9 would enter the brake mechanism 12 at the same point as the pipe 13 enters the brake mechanism 11, and will bring about the same charging effects in the brake mechanism 12 as have fully been described in connection with the brake mechanism 11.

After the closing of the valve head 34 against its seat, there will be a pressure rise in tanks 1, 10a, and 10b, and the parts of the system directly associated therewith, until the normal operating pressure of the system is reached. The air pressure trapped in chambers 36, 43, and 64 will correspond to emergency pressure, or, in other words, to the pressure existing in the passage 35, Fig. 2, at the time the valve head 34 is brought into engagement with its seat. The brakes cannot be released except by release of pressure from the chamber 64. This is accomplished by making a full application of the brakes in the normal manner by depressing the pedal 7, Fig. 1, so as to feed the higher-pressure air from tank 1 into the passage 41 of Fig. 2, this air pressure in the passage 41, being greater than the emergency air pressure in the chamber 43, will result in the leftward movement of the closure 39 away from the seat 42; at the same time the air pressure from the passage 41 will be exerted in the chamber 64 to actuate the diaphragm 48 downward. When the operator returns the foot pedal 7 to its initial position, passage 41, Fig. 2, will be opened to atmosphere through the valve 6 and the pressure may then bleed from the chambers 36, 43, and 64 through the passage 41 and the pipes which connect it to the valve 6. Release of pressure from the chamber 64 permits the exhaust head 50 to rise, whereby the valve 56 will move upward so that its closure 61 will engage its seat and so that air pressure from the brake chambers may bleed out to atmosphere through the chamber 54, nipple 53, and the passage 51 of Fig. 2.

In a regular normal application of the brakes by the driver, with the truck running on the roadway, the mode of operation of applying the brakes is substantially the same as that described above, except that it is not necessary for the driver to make a full pressure application of the brakes if he does not wish to apply the brakes with the fullest possible force. This is because at that time there will be no pressure except atmospheric pressure in the brake pipes and the brake chambers.

Should the truck or truck and trailer be driven during the preliminary charging period before the pressure in the tank 1 and the pipes 9, 13, and 14 has raised sufficiently to depress the diaphragm 29, Fig. 2, against the force of the spring 32, the brakes may be actuated with whatever pressure exists in the tank 1, this operation of the brakes being made possible due to the following. When the valve head 33 is closed against its seat, the valve head 34 will be in open position; therefore, opening of the valve 6 will feed such pressure as exists in the tank 1 through the pipes 18 and 21, this pressure passing through the ports 41, around the closures 39 and then through the ducts 37. A portion of the pressure will at the same time pass downward through the passage 44 into the chamber 64 to depress the head 50, so that pressure may flow from the chamber 36 past the open valve head 34, thence through the passage 35 and through the chamber 54 to the ducts 22 and 25, leading to the brake chambers 23 and 26. As soon as the emergency range of pressure is reached in the system so that pressure against the diaphragm 29 moves the valve head 33 into open relation to its seat, the brakes will be automatically applied and the driver must then wait until normal operating pressure is reached in the system, whereupon he may then release the brakes by operating the valve 6, as previously described herein.

Furthermore, this apparatus has advantages, if through carelessness or inadvertence the trailer hoses 15 and 19 are connected up to the pipes 9 and 17 in a crossed relation. If, through carelessness, they are connected up in that way, the trailer brakes will apply automatically and cannot be released unless the trouble is corrected and the operating fluid or air completely exhausted from the system. In this way a driver is prevented from taking the truck out unless the hoses 15 and 19 are properly connected.

If a drop in the main reservoir pressure occurs, either from leakage or due to the breaking of the hose 15, the brakes will be applied automatically when a predetermined minimum pressure is reached. This pressure is that pressure at which the spring 32 may move the valve head 34 upward from closed position to open relation to its seat and is such as will bring the truck and trailer to a quick and gentle stop without locking the wheels.

The advantages of this apparatus when a mechanic is testing the brakes under the truck or trailer himself, and independently of the driver's valve 6, have already been described.

If the trailer breaks away from the truck towing it, the brakes on the trailer will be automatically applied. This will occur because the atmospheric pressure that will then exist in the chamber 31 will be insufficient to hold back the spring 32, which will move the valve 28 forward and permit flow of the operating fluid from the tank 10b of the trailer through its bypass 37, which will force the shuttle valve 39 over against the seat 42 and close off any possible exit through the service pipe 21, thereby permitting the operating fluid to pass into the chamber 64, which overcomes the spring pressure 55 and opens the valve 56. This will apply the brakes by operating fluid from the tank 10b flowing through the brake pipe 27 of the trailer. In the manner just described, the supply valve 28 operates as an emergency valve.

Many other embodiments of this invention may be resorted to without departing from the spirit of the invention.

I claim as my invention:

1. In a brake system of the character described, the combination of: fluid actuated means for applying the brake; means for delivering fluid to the fluid actuated means to apply the brake, comprising a fluid pressure operated valve for controlling the applying of fluid under pressure to said fluid actuated means; operator controlled means for applying fluid pressure to said fluid pressure operated valve to operate the same and thereby effect an application of the brake; an auxiliary valve operating automatically in response to emergency conditions to supply fluid pressure to said fluid pressure operated valve to operate the same and thereby apply the brake independently of the use of said operator controlled means; and means for holding in said fluid pressure operated valve the fluid pressure applied thereto by said auxiliary valve, the last mentioned means being operable in response to the operation of said operator controlled means subsequent to the operation of said auxiliary valve, for effectuating release of fluid pressure from said fluid pressure operated valve so that the brake will then release.

2. In a vehicle brake system, the combination of: a vehicle brake means; operator controlled valve means for controlling the application and release of the vehicle brake means; automatic means operating under prescribed conditions to apply the vehicle brake and maintain the brake in applied condition so that from this applied condition of the brake when an attempt is made to move the vehicle, the operator will know that said automatic means has been caused to operate; and means operating only in response to the operation of said operator controlled means subsequent to the operation of said automatic means to release the brake from its application by said automatic means.

3. In a brake system of the character described, the combination of: fluid actuated means for applying the brake; a source of fluid under pressure; a fluid pressure operated control valve device for controlling the delivery of fluid under pressure from said source to said fluid actuated means to apply the brake, said valve device having a pressure chamber for receiving the fluid pressure by which it is operated; operator controlled means comprising an operator controlled valve and a duct connecting it to said chamber for supplying fluid pressure to and releasing fluid pressure from said chamber, whereby the application and release of said brake may be effected; and automatic means operating in response to emergency conditions to deliver fluid under pressure to said chamber, said automatic means comprising a shut off valve actuated when said automatic means operates to close said duct so that fluid pressure will not escape from said chamber through said duct, said shut off valve being adapted to open in response to a subsequent application of said operator controlled means.

4. In a brake system of the character described, the combination of: fluid actuated means for applying the brake; a source of fluid under pressure; a fluid pressure operated control valve device for controlling the delivery of fluid under pressure from said source to said fluid actuated means to apply the brake, said valve device having a pressure chamber for receiving the fluid pressure by which it is operated; operator controlled means comprising an operator controlled valve and a duct connecting it to said chamber for supplying fluid pressure to and releasing fluid pressure from said chamber, whereby the application and release of said brake may be effected; and automatic means operating in response to emergency conditions to deliver fluid under pressure to said chamber, said automatic means comprising a shut off valve actuated when said automatic means operates to close said duct so that fluid pressure will not escape from said chamber through said duct, said shut off valve being adapted to open in response to fluid pressure delivered to said duct from said operator controlled valve as the result of a subsequent application of said operator controlled means.

5. In a brake system of the character described, the combination of: fluid actuated means for applying the brake; a source of fluid under pressure; a reservoir for receiving fluid under pressure from said source; means operating in response to changes in fluid pressure in said source for opening and closing communication between said source and said reservoir; means for delivering fluid to the fluid actuated means to apply the brake, comprising a fluid pressure operated valve for controlling the applying of fluid under pressure from said reservoir to said fluid actuated means; operator controlled means for applying fluid pressure to said fluid pressure operated valve to operate the same and thereby effect an application of the brake; an auxiliary valve operating automatically in response to emergency conditions to apply fluid pressure to said fluid pressure operated valve to operate the same and thereby apply the brake independently of the use of said operator controlled means, said fluid pressure operated valve being adapted to maintain the fluid pressure applied thereto by said auxiliary valve, said valve also operating in response to the operation of said operator controlled means subsequent to the operation of said auxiliary valve, for effectuating release of fluid pressure so that the brake will then release.

6. In a brake system of the character described, the combination of: fluid actuated means for applying the brake; a source of fluid under pressure; a reservoir for receiving fluid under pressure from said source; means operating in response to changes in fluid pressure in said source for opening and closing communication between said source and said reservoir; means for delivering fluid to the fluid actuated means to apply the brake, comprising a fluid pressure operated valve for controlling the applying of fluid under pressure from said reservoir to said fluid actuated means; operator controlled means for applying fluid pressure to said fluid pressure operated valve to operate the same and thereby effect an application of the brake; an auxiliary valve operating automatically in response to a reduction in pressure in said source below a predetermined value to apply fluid pressure from said reservoir to said fluid pressure operated valve to operate the same and thereby apply the brake independently of the use of said operator controlled means, said fluid pressure operated valve being movable to a position for maintaining the fluid pressure applied thereto by said auxiliary valve, said valve also operating in response to the operation of said operator controlled means subsequent to the operation of said auxiliary valve, for effectuating release of said fluid pressure so that the brake will then release.

7. In a brake system of the character described, the combination of: fluid actuated means for applying the brake; a source of fluid under pressure; a reservoir for receiving fluid under pressure from said source; a fluid pressure operated control valve device for controlling the delivery of fluid under pressure from said reservoir to said fluid actuated means to apply the brake, said valve device having a pressure chamber for receiving the fluid pressure by which it is operated, said chamber having a first inlet port and a second inlet port; operator controlled means having an operator controlled valve and a duct connected to said first inlet port for supplying fluid under pressure to said chamber from said source and releasing fluid pressure from said chamber whereby the application and release of said brake may be effected; automatic means operating in response to prescribed pressures in said source to connect said reservoir to said second inlet port and to close off communication between said source and said reservoir; and a valve closure element movable by said fluid under pressure received from said automatic means into a position closing said first port so that fluid pressure cannot escape from said chamber through said duct; said valve element being adapted to be moved into open relation to said first inlet port by fluid pressure received through said duct.

8. In a brake system of the character described, the combination of: fluid actuated means for applying the brake; a source of fluid under pressure; a reservoir for receiving fluid under pressure from said source; a fluid pressure operated control valve device for controlling the delivery of fluid under pressure from said reservoir to said fluid actuated means to apply the brake, said valve device having a pressure chamber for receiving the fluid pressure by which it is operated, said chamber having a first inlet port and a second inlet port; operator controlled means having an operator controlled valve and a duct connected to said first inlet port for supplying fluid under pressure to said chamber from said source and releasing fluid pressure from said chamber whereby the application and release of said brake may be effected; automatic means comprising a casing having a part connected to said source and a second part connected to said reservoir, there being means in said part connected to said source responding to prescribed pressures in said part connected to said source to connect said reservoir to said second inlet port and to close off communication between said source and said reservoir; and a valve closure element movable by said fluid under pressure received from said automatic means into a position closing said first port so that fluid pressure cannot escape from said chamber through said duct, said valve closure element being adapted to be moved into open relation to said first inlet port by fluid pressure received through said duct.

THEODORE H. AFFLECK.